(12) United States Patent
Tatsushima et al.

(10) Patent No.: US 12,370,761 B2
(45) Date of Patent: Jul. 29, 2025

(54) PARAMETER DETERMINATION METHOD AND PARAMETER DETERMINATION APPARATUS

(71) Applicant: HONDA MOTOR CO., LTD., Tokyo (JP)

(72) Inventors: Kosuke Tatsushima, Wako (JP); Kazufusa Miyajima, Wako (JP); Toru Koseki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 203 days.

(21) Appl. No.: 18/072,894

(22) Filed: Dec. 1, 2022

(65) Prior Publication Data

US 2023/0173770 A1    Jun. 8, 2023

(30) Foreign Application Priority Data

Dec. 3, 2021   (JP) .................................. 2021-196572

(51) Int. Cl.
*B29C 70/54* (2006.01)
*B29C 70/32* (2006.01)
*B29L 31/00* (2006.01)

(52) U.S. Cl.
CPC .............. *B29C 70/54* (2013.01); *B29C 70/32* (2013.01); *B29L 2031/7156* (2013.01)

(58) Field of Classification Search
CPC ..................................................... B29C 70/54
See application file for complete search history.

(56) References Cited

U.S. PATENT DOCUMENTS

| 2018/0163926 A1 | 6/2018 | Fujiki et al. |
| 2019/0344512 A1 | 11/2019 | Kobayashi et al. |

FOREIGN PATENT DOCUMENTS

| JP | S40-006063 B | | 3/1965 |
| JP | 7-16937 A | * | 1/1995 |
| JP | 2018-096459 A | | 6/2018 |
| JP | 2019-195955 A | | 11/2019 |
| JP | 2020-131430 A | | 8/2020 |
| JP | 2021-109427 A | | 8/2021 |
| KR | 880000604 B1 | * | 4/1988 |

OTHER PUBLICATIONS

Office Action dated Jul. 30, 2024 issued in the corresponding Japanese Patent Application No. 2021-196572 with the English machine translation thereof.

* cited by examiner

*Primary Examiner* — Jeffry H Aftergut
(74) *Attorney, Agent, or Firm* — Carrier, Shende & Associates P.C.; Joseph P. Carrier; Jeffrey T. Gedeon (57) ABSTRACT

A computer determines winding parameters based on the width of reinforced fibers, the angle between the reinforced fibers and an imaginary line, and the outer diameter of a cylinder section.

5 Claims, 10 Drawing Sheets

| COMBINATION NUMBER | INTEGER PART OF ROTATION | NUMBER OF CYCLES | NUMBER OF SKIPS | PROPRIETY DETERMINATION |
|---|---|---|---|---|
| 1 | EVEN NUMBER | EVEN NUMBER | $4a$ | NO GOOD |
| 2 | EVEN NUMBER | EVEN NUMBER | $4a+2$ | OK |
| 3 | EVEN NUMBER | ODD NUMBER | $4a$ | OK |
| 4 | EVEN NUMBER | ODD NUMBER | $4a+2$ | NO GOOD |
| 5 | ODD NUMBER | EVEN NUMBER | $4a$ | NO GOOD |
| 6 | ODD NUMBER | EVEN NUMBER | $4a+2$ | OK |
| 7 | ODD NUMBER | ODD NUMBER | $4a$ | NO GOOD |
| 8 | ODD NUMBER | ODD NUMBER | $4a+2$ | OK |

| SEGMENT NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| WINDING POSITION OF FIRST YARN FEEDING UNIT | 1 | | 10 | | 6 | | 2 | | 11 | | 7 | | 3 | | 12 | | 8 | | 4 | | 13 | | 9 | | 5 | |
| WINDING POSITION OF SECOND YARN FEEDING UNIT | | 5 | | 1 | | 10 | | 6 | | 2 | | 11 | | 7 | | 3 | | 12 | | 8 | | 4 | | 13 | | 9 |

FIG. 10

| SEGMENT NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| WINDING POSITION OF FIRST YARN FEEDING UNIT | 1 | | 11 | | 8 | | 5 | | 2 | | 12 | | 9 | | 6 | | 3 | | 13 | | 10 | | 7 | | 4 | |
| WINDING POSITION OF SECOND YARN FEEDING UNIT | 7 | | 4 | | 1 | | 11 | | 8 | | 5 | | 2 | | 12 | | 9 | | 6 | | 3 | | 13 | | 10 | |

PARAMETER DETERMINATION METHOD AND PARAMETER DETERMINATION APPARATUS

CROSS-REFERENCE TO RELATED APPLICATIONS

This application is based upon and claims the benefit of priority from Japanese Patent Application No. 2021-196572 filed on Dec. 3, 2021, the contents of which are incorporated herein by reference.

BACKGROUND OF THE INVENTION

Field of the Invention

The present invention relates to a parameter determination method and a parameter determination apparatus for determining a plurality of winding parameters to be set in a container manufacturing apparatus.

Description of the Related Art

A fuel cell vehicle generates electricity by supplying hydrogen and oxygen to a fuel cell. The fuel cell vehicle includes a high-pressure container filled with hydrogen gas. The high-pressure container has an inner layer and an outer layer covering the inner layer. The inner layer is a liner made of resin. The outer layer is a reinforcing layer made of fiber-reinforced resin (FRP). The reinforcing layer is formed by winding a band-shaped reinforced fiber around the liner without a gap.

JP 2018-096459 A discloses a container manufacturing apparatus for manufacturing a high-pressure container by winding reinforced fibers around a liner. The container manufacturing apparatus includes a support device that supports the liner, and a yarn feeding device that supplies reinforced fibers to the liner. The support device is capable of rotating the liner about an axis of the liner. The yarn feeding device can feed the reinforced fibers from the yarn-feeding outlet port while moving the yarn-feeding outlet port parallel to the axis of the liner.

SUMMARY OF THE INVENTION

It is desirable to reduce the amount of reinforced fibers to be wound on the liner while maintaining the strength of the high-pressure container. For this purpose, it is necessary to efficiently wind the reinforced fibers around the liner.

An object of the present invention is to solve the above problem.

According to a first aspect of the present invention, there is provided a parameter determination method for determining, using a computer, a plurality of winding parameters for operating a container manufacturing apparatus that manufactures a high-pressure container by winding a plurality of band-shaped reinforced fibers around a liner, wherein the liner includes a first dome section located at one end of the liner, a second dome section located at another end of the liner, and a cylinder section located between the first dome section and the second dome section, the container manufacturing apparatus repeatedly performs a cycle of a winding operation in which a winding position of each of the reinforced fibers is moved from the first dome section through the cylinder section to the second dome section and then moved back from the second dome section through the cylinder section to the first dome section, and the container manufacturing apparatus inclines the reinforced fibers with respect to an imaginary line parallel to an axis of the high-pressure container, when winding the reinforced fibers around the cylinder section, the parameter determination method including: with the computer, determining the winding parameters based on a width of the reinforced fibers, an angle formed by the reinforced fibers and the imaginary line, and an outer diameter of the cylinder section.

According to a second aspect of the present invention, there is provided a parameter determination apparatus that determines a plurality of winding parameters for operating a container manufacturing apparatus that manufactures a high-pressure container by winding a plurality of band-shaped reinforced fibers around a liner, the parameter determination apparatus including: a parameter calculation unit configured to determine the winding parameters, wherein the liner includes a first dome section located at one end of the liner, a second dome section located at another end of the liner, and a cylinder section located between the first dome section and the second dome section, the container manufacturing apparatus repeatedly performs a cycle of a winding operation in which a winding position of each of the reinforced fibers is moved from the first dome section through the cylinder section to the second dome section and then moved back from the second dome section through the cylinder section to the first dome section, the container manufacturing apparatus inclines the reinforced fibers with respect to an imaginary line parallel to an axis of the high-pressure container, when winding the reinforced fibers around the cylinder section, and the parameter calculation unit determines the winding parameters based on a width of the reinforced fibers, an angle formed by the reinforced fibers and the imaginary line, and an outer diameter of the cylinder section.

According to the present invention, it is possible to efficiently wind the band-shaped reinforced fibers around the liner.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

1. High-Pressure Container 10

Figure 1:
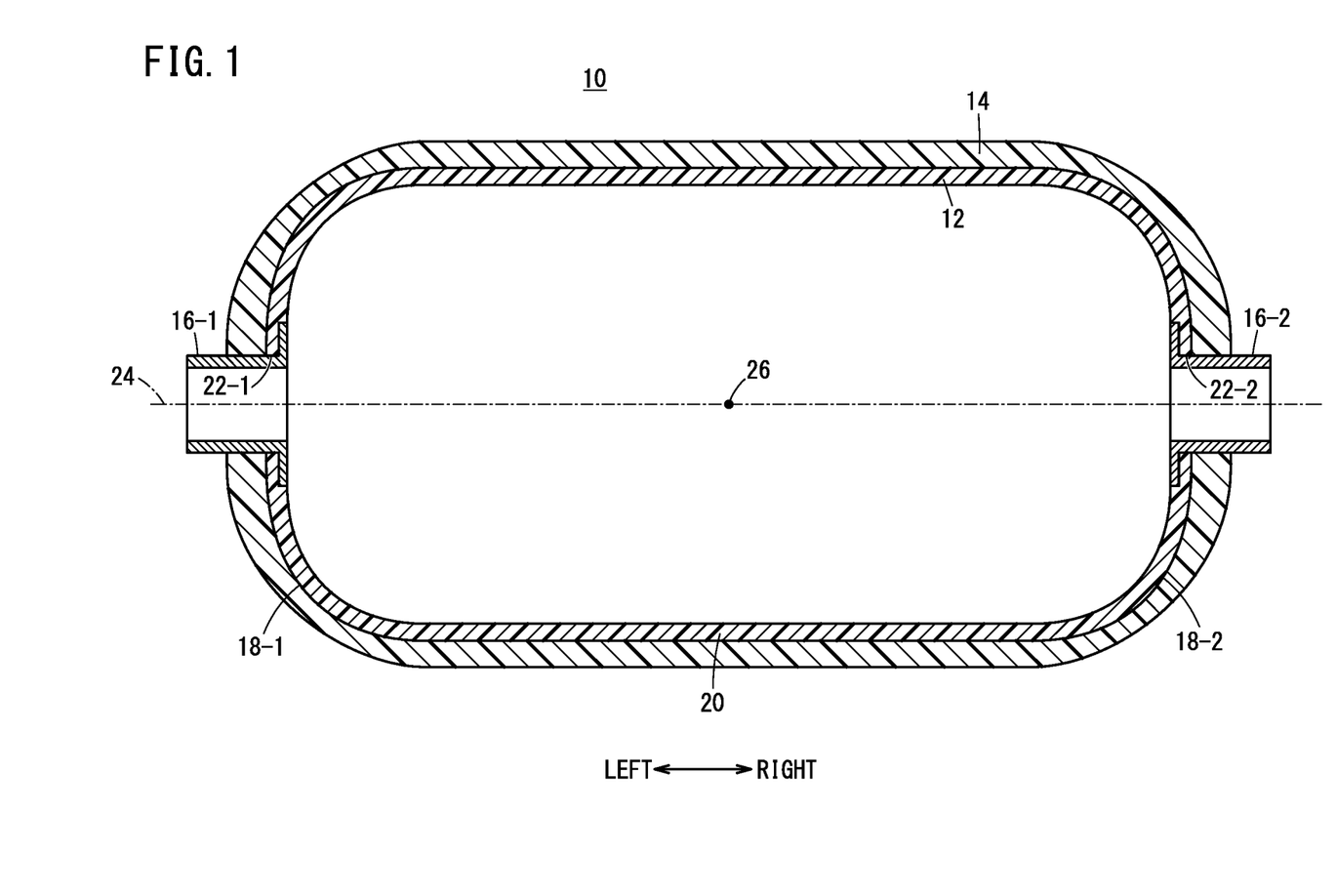
FIG. 1 is a schematic cross-sectional view of a high-pressure container.

FIG. 1 is a schematic cross-sectional view of a high-pressure container 10. The cross-sectional view of FIG. 1 is taken along an axis 24 of the high-pressure container 10. The high-pressure container 10 is mounted on, for example, a fuel cell vehicle. Such a fuel cell vehicle generates electricity by supplying hydrogen and oxygen to a fuel cell. The high-pressure container 10 is filled with high-pressure hydrogen gas. The high-pressure container 10 includes a liner 12, a reinforcing layer 14, a first cap 16-1, and a second cap 16-2.

For example, the liner 12 is made of a high-density polyethylene (HDPE) resin, which is a thermoplastic resin having hydrogen barrier properties. The liner 12 includes a dome-shaped first dome section 18-1, a dome-shaped second dome section 18-2, and a cylinder-shaped cylinder section 20. The first dome section 18-1 is located at one end of the liner 12. A first opening 22-1 is formed in the first dome section 18-1. The second dome section 18-2 is located at the other end of the liner 12. A second opening 22-2 is formed in the second dome section 18-2. The cylinder section 20 is located between the first dome section 18-1 and the second dome section 18-2. For convenience of explanation, the direction in which the first dome section 18-1 is disposed is defined as the left direction or the left side. Further, the direction in which the second dome section 18-2 is disposed is defined as the right direction or the right side. The axis 24 of the high-pressure container 10 passes through the center of the first opening 22-1, the center of the second opening 22-2, and the center of the cylinder section 20.

Figure 2:
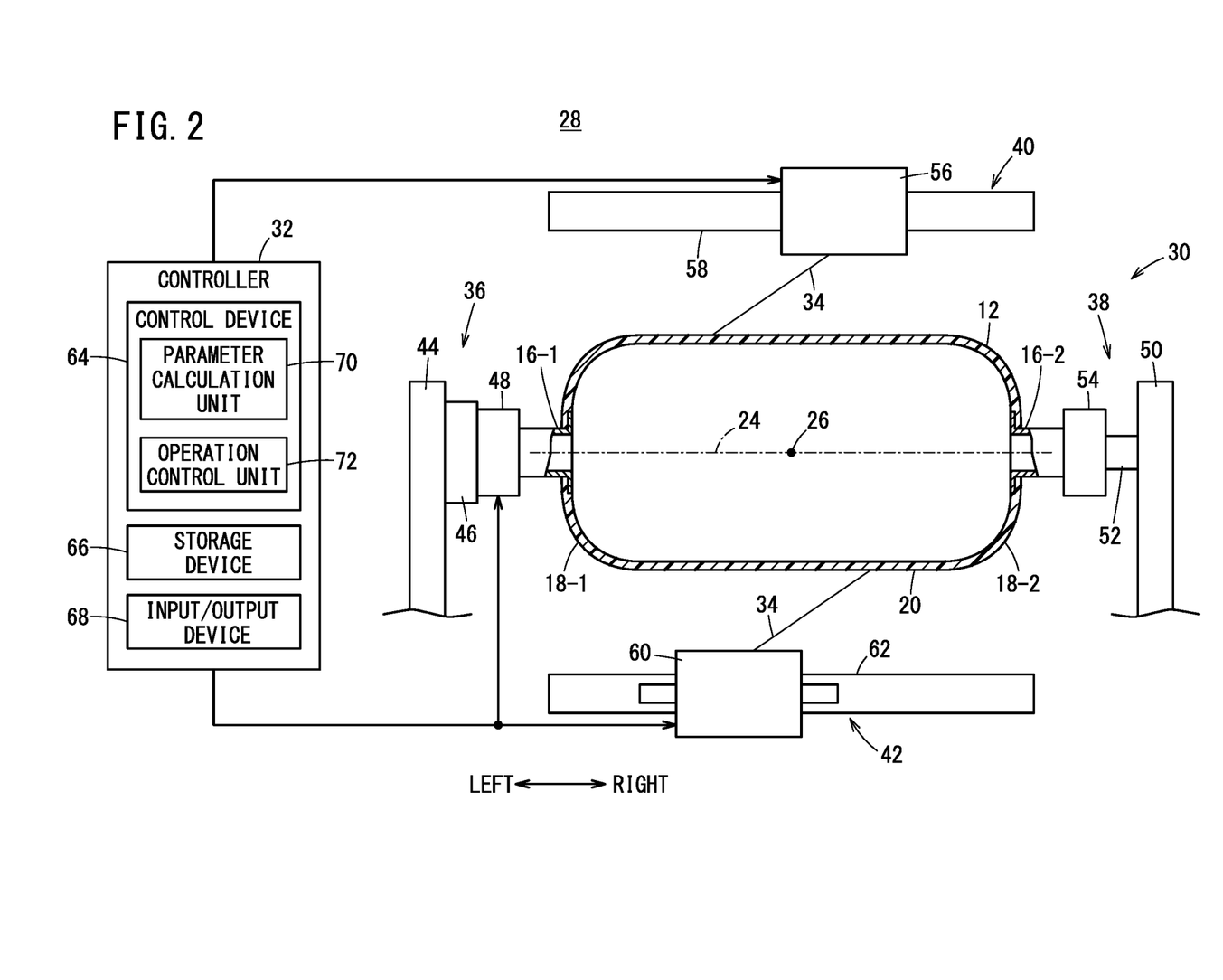
FIG. 2 is a schematic configuration diagram of a container manufacturing system.

For example, the reinforcing layer 14 is made of a fiber reinforced resin (FRP) in which reinforced fibers are impregnated with a resin base material. As shown in FIG. 2, the reinforcing layer 14 is formed by winding band-shaped reinforced fibers containing a resin base material around the outer wall of the liner 12. The band-shaped reinforced fibers including the resin base material are referred to as band-shaped fibers 34. One band-shaped fiber 34 is formed of a plurality of tow-prepregs. The reinforcing layer 14 covers the outer wall surface of the liner 12 without any gap.

The first cap 16-1 is fitted into the first opening 22-1. The second cap 16-2 is fitted into the second opening 22-2. Each of the tip of the first cap 16-1 and the tip of the second cap 16-2 is exposed from the reinforcing layer 14. A pipe for supplying hydrogen gas from the high-pressure container 10 to the fuel cell is connected to the first cap 16-1. A pipe for replenishing hydrogen gas from a hydrogen supply source to the high-pressure container 10 is connected to the second cap 16-2.

2. Container Manufacturing System 28

FIG. 2 is a schematic configuration diagram of the container manufacturing system 28. In the container manufacturing system 28, two band-shaped fibers 34 are wound on the outer wall surface of the liner 12 without any gap. The operation of winding the band-shaped fiber 34 around the liner 12 is referred to as a winding operation. The container manufacturing system 28 includes a container manufacturing apparatus 30 and a controller 32.

[2-1. Container Manufacturing Apparatus 30]

The container manufacturing apparatus 30 includes a first support device 36, a second support device 38, a first yarn feeding device 40, and a second yarn feeding device 42.

The first support device 36 includes a first support column 44, a rotation drive unit 46, and a first support portion 48. The first support column 44 supports the rotation drive unit 46. The rotation drive unit 46 supports the first support portion 48. The rotation drive unit 46 can rotate the first support portion 48 by a motor or the like. The first support portion 48 supports the first cap 16-1 of the liner 12. The first cap 16-1 is attachable to and detachable from the first support portion 48.

The second support device 38 includes a second support column 50, a support shaft 52, and a second support portion 54. The second support column 50 supports the support shaft 52. The support shaft 52 supports the second support portion 54. The support shaft 52 can rotate the second support portion 54 relative to the second support column 50. The second support portion 54 supports the second cap 16-2 of the liner 12. The second cap 16-2 is attachable to and detachable from the second support portion 54.

The liner 12 supported by the first support device 36 and the second support device 38 rotates about the axis 24 as a result of driving of the motor of the rotation drive unit 46.

The first yarn feeding device 40 includes a first yarn feeding unit 56, a first drive unit 58, a plurality of first creels (not shown), and a first impregnation unit (not shown). A tow-prepreg is wound around each of the first creels. The first impregnation unit bundles a plurality of tow-prepregs to form a first band-shaped fiber 34. Further, the first impregnation unit impregnates the first band-shaped fiber 34 with a resin. The first band-shaped fiber 34 is conveyed from the first impregnation unit to the first yarn feeding unit 56. The first yarn feeding unit 56 feeds the first band-shaped fiber 34 to the liner 12. The first drive unit 58 can reciprocate the first yarn feeding unit 56 to the left and right by a motor or the like. The first drive unit 58 changes (moves) the winding position of the first band-shaped fiber 34 relative to the liner 12 by moving the first yarn feeding unit 56.

The second yarn feeding device 42 includes a second yarn feeding unit 60, a second drive unit 62, a plurality of second creels (not shown), and a second impregnation unit (not shown). A tow-prepreg is wound around each of the second creels. The second impregnation unit bundles a plurality of tow-prepregs to form a second band-shaped fiber 34. Further, the second impregnation unit impregnates the second band-shaped fiber 34 with a resin. The second band-shaped fiber 34 is conveyed from the second impregnation unit to the second yarn feeding unit 60. The second yarn feeding unit 60 delivers the second band-shaped fiber 34 to the liner 12. The second drive unit 62 can reciprocate the second yarn feeding unit 60 to the left and right by a motor or the like. The second drive unit 62 changes (moves) the winding position of the second band-shaped fiber 34 relative to the liner 12 by moving the second yarn feeding unit 60.

The first yarn feeding unit 56 and the second yarn feeding unit 60 are configured to be always disposed at positions that are point-symmetric with respect to the center 26 of the liner 12. When the first yarn feeding unit 56 moves to the right, the second yarn feeding unit 60 moves to the left. When the first yarn feeding unit 56 moves to the left, the second yarn feeding unit 60 moves to the right.

FIG. 2 shows an example of the container manufacturing apparatus 30. The container manufacturing apparatus 30 may have another configuration. However, such a container manufacturing apparatus 30 of the other configuration also needs to include the first yarn feeding unit 56 and the second yarn feeding unit 60. In the other configurations as well, the first yarn feeding unit 56 and the second yarn feeding unit 60 are configured to be always disposed at point-symmetric positions with respect to the center 26 of the liner 12.

[2-2. Controller 32]

The controller 32 is a computer. The controller 32 is also a parameter determination apparatus. The controller 32 includes a control device 64, a storage device 66, and an input/output device 68.

The control device 64 includes a processing circuit and a control circuit. The processing circuit may be a processor such as a central processing unit (CPU). The processing circuit may be an integrated circuit such as an application specific integrated circuit (ASIC) or a field programmable gate array (FPGA). The processor can execute various processes by executing a program stored in the storage device 66. The control device 64 functions as a parameter calculation unit 70 and an operation control unit 72. The parameter calculation unit 70 determines winding parameters for winding two band-shaped fibers 34 on the outer wall surface of the liner 12 without a gap. The parameter calculation unit 70 determines the winding parameters based on the design information of the high-pressure container 10 shown in FIG. 6. The algorithm used by the parameter calculation unit 70 is designed so as to reduce the amount of the band-shaped fiber 34 used. The operation control unit 72 controls the motor of the rotation drive unit 46, the motor of the first drive unit 58, and the motor of the second yarn feeding unit 60, based on the winding parameters determined by the parameter calculation unit 70.

The storage device 66 includes a volatile memory and a nonvolatile memory. As examples of the volatile memory, there may be cited a RAM or the like. As examples of the nonvolatile memory, there may be cited a ROM, a flash memory, or the like. The volatile memory stores, for example, data acquired from the outside, data calculated by the control device 64, and the like. The nonvolatile memory stores, for example, predetermined programs, predetermined data, and the like. The non-volatile memory stores a confirmation table (reference table) 74 shown in FIG. 3. The confirmation table 74 will be described later. At least part of the storage device 66 may be included in a processor, an integrated circuit, or the like as described above.

The input/output device 68 includes various interfaces. For example, the input/output device 68 includes a human-machine interface. For example, the human-machine interface is a touch panel, a switch, a keyboard, a display, or the like.

3. Winding Trajectory 76 of Band-Shaped Fiber 34

Figure 4:
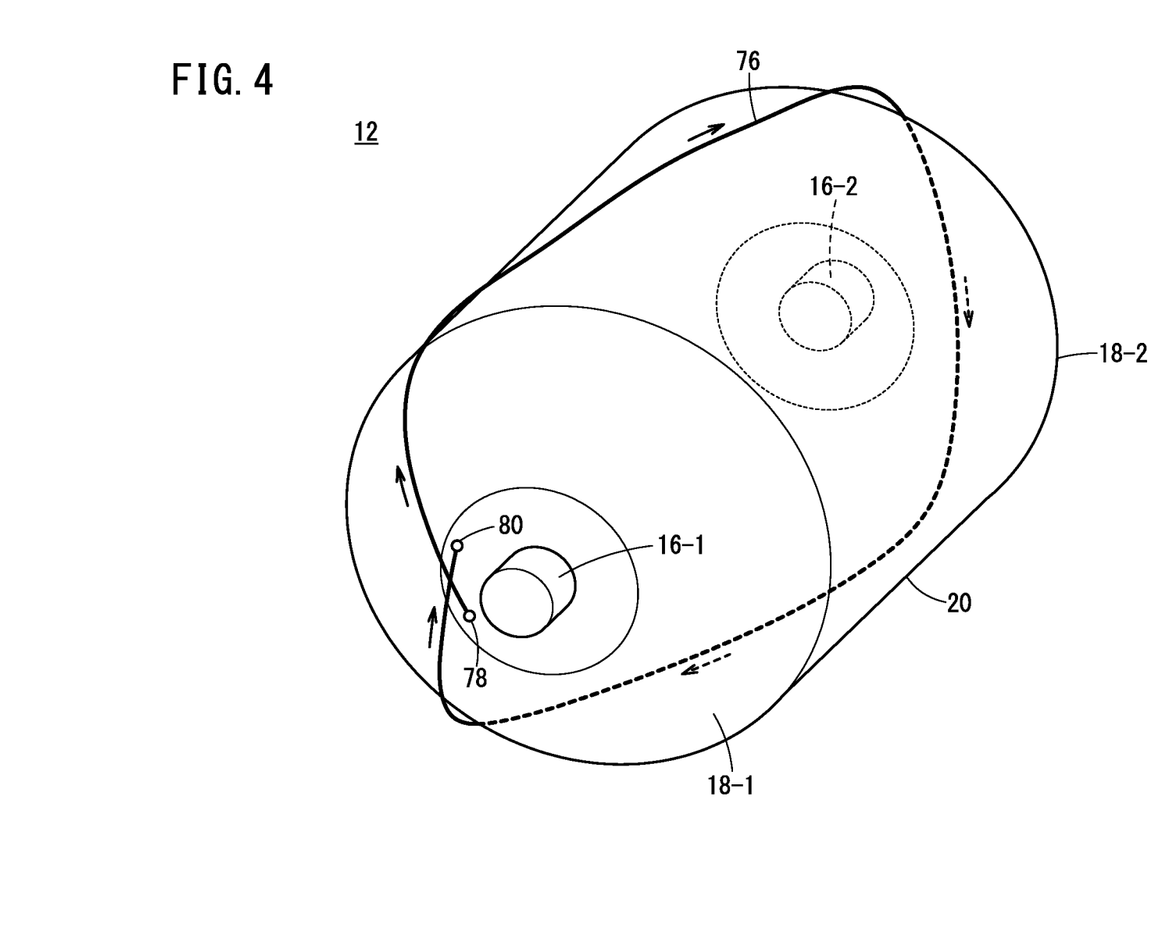
FIG. 4 is a perspective view of a liner showing a winding trajectory of a band-shaped fiber.
Figure 5:
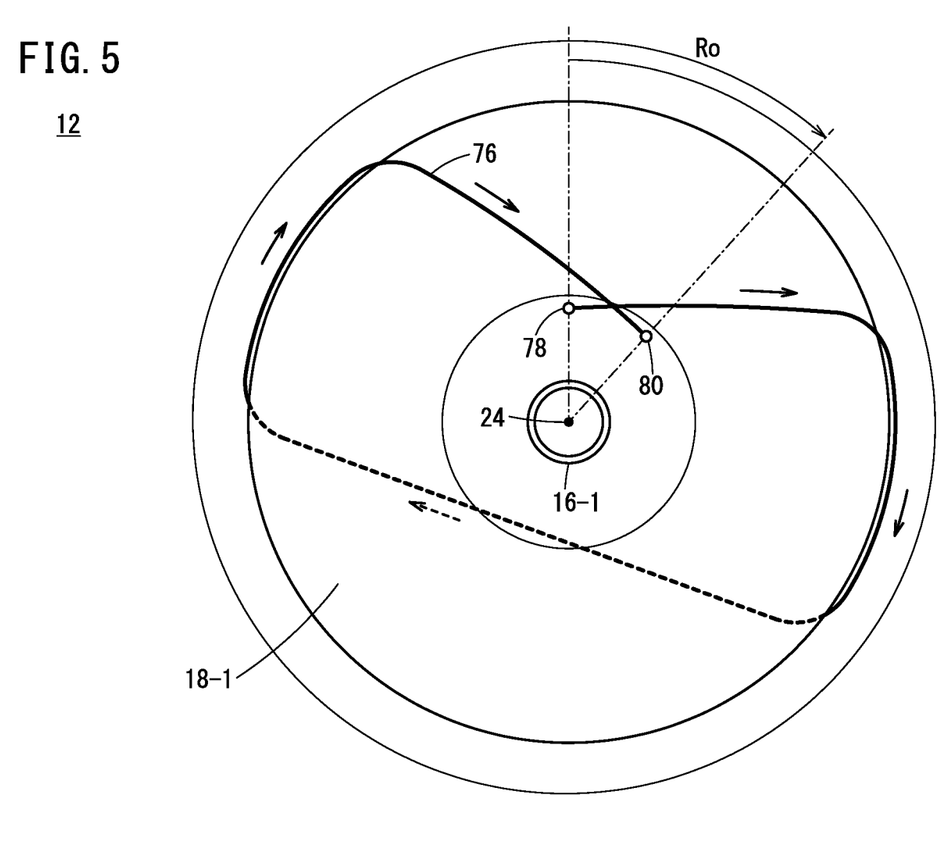
FIG. 5 is a left side view of the liner showing the winding trajectory of the band-shaped fiber.

FIG. 4 is a perspective view of the liner 12 showing the winding trajectory 76 of the band-shaped fiber 34. FIG. 5 is a left side view of the liner 12 showing the winding trajectory 76 of the band-shaped fiber 34. The container manufacturing apparatus 30 operates the first yarn feeding unit 56 and the second yarn feeding unit 60 while rotating the liner 12, and guides the band-shaped fibers 34 to the outer wall surface of the liner 12. For example, the container manufacturing apparatus 30 changes (moves) the winding position of the band-shaped fiber 34 fed from the first yarn feeding unit 56 in accordance with the winding trajectory 76 shown in FIGS. 4 and 5. The container manufacturing apparatus 30 changes (moves) the winding position of the band-shaped fiber 34 from a start point 78 to an end point 80, in accordance with the winding trajectory 76. That is, the container manufacturing apparatus 30 moves the winding position of the band-shaped fiber 34 from the first dome section 18-1 through the cylinder section 20 to the second dome section 18-2 and then moves it back from the second dome section 18-2 through the cylinder section 20 to the first dome section 18-1, in one cycle of the winding operation. The container manufacturing apparatus 30 repeats the cycle of the winding operation while moving the winding position of the band-shaped fiber 34 in the circumferential direction of the liner 12. The winding trajectory 76 of the band-shaped fiber 34 fed from the second yarn feeding unit 60 is also the same as the winding trajectory 76 of the band-shaped fiber 34 fed from the first yarn feeding unit 56.

4. Design Information

Figure 6:
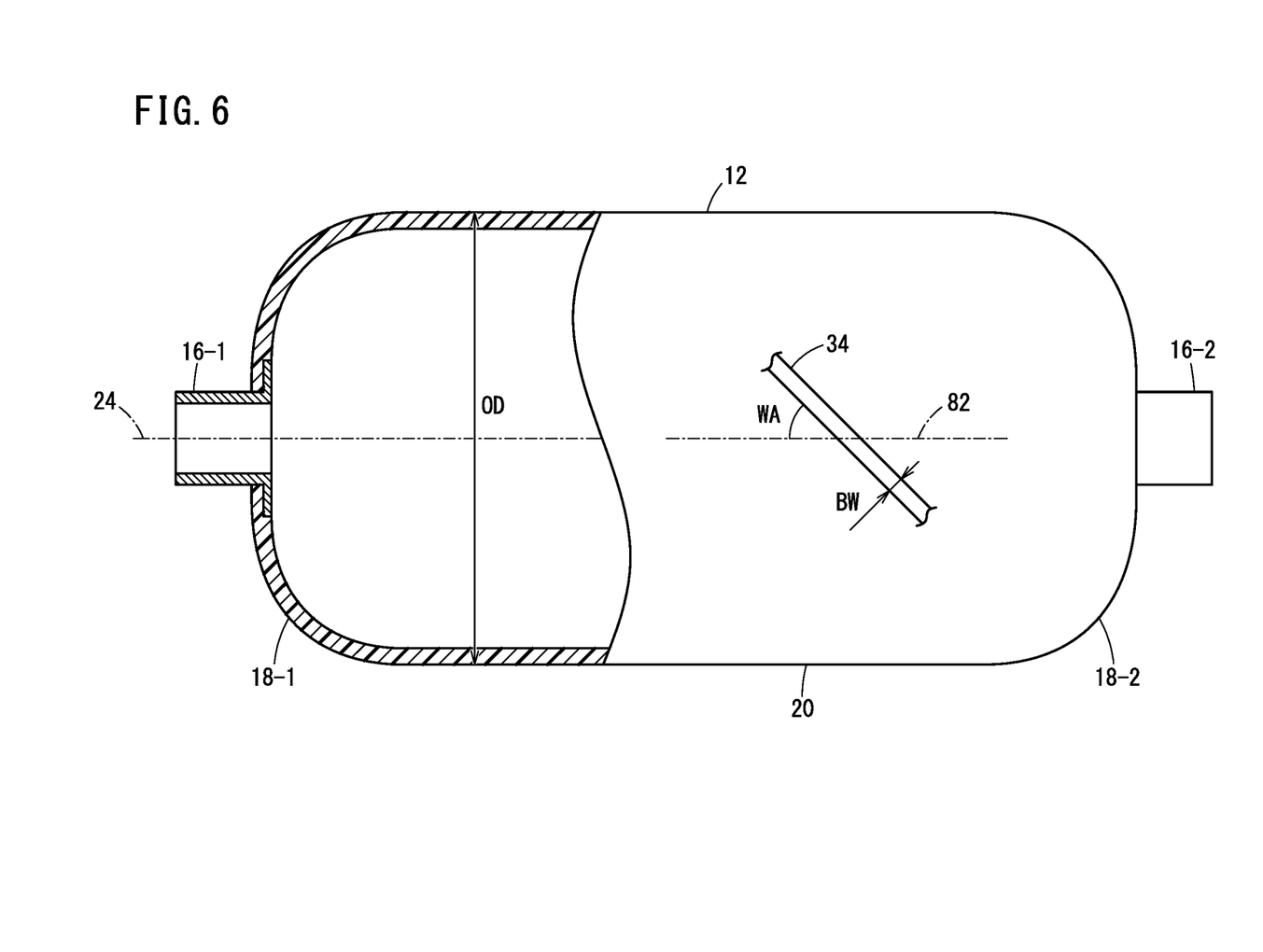
FIG. 6 is a diagram showing design information of the high-pressure container.

The parameter calculation unit 70 uses design information of the high-pressure container 10 to determine the winding parameters. Here, the design information will be described. FIG. 6 is a diagram showing the design information of the high-pressure container 10. The design information includes a width BW, an angle WA, and an outer diameter OD. The width BW is the width of the band-shaped fiber 34. The angle WA is an angle formed by the band-shaped fiber 34 and an imaginary line 82. The imaginary line 82 is a straight line extending parallel to the axis 24 along the outer wall surface of the cylinder section 20. The outer diameter OD is the outer diameter of the cylinder section 20. The design information also includes information on the length of the liner 12 in the axial direction, the shape of each dome section, and the like.

5. Winding Parameters

Figure 7:
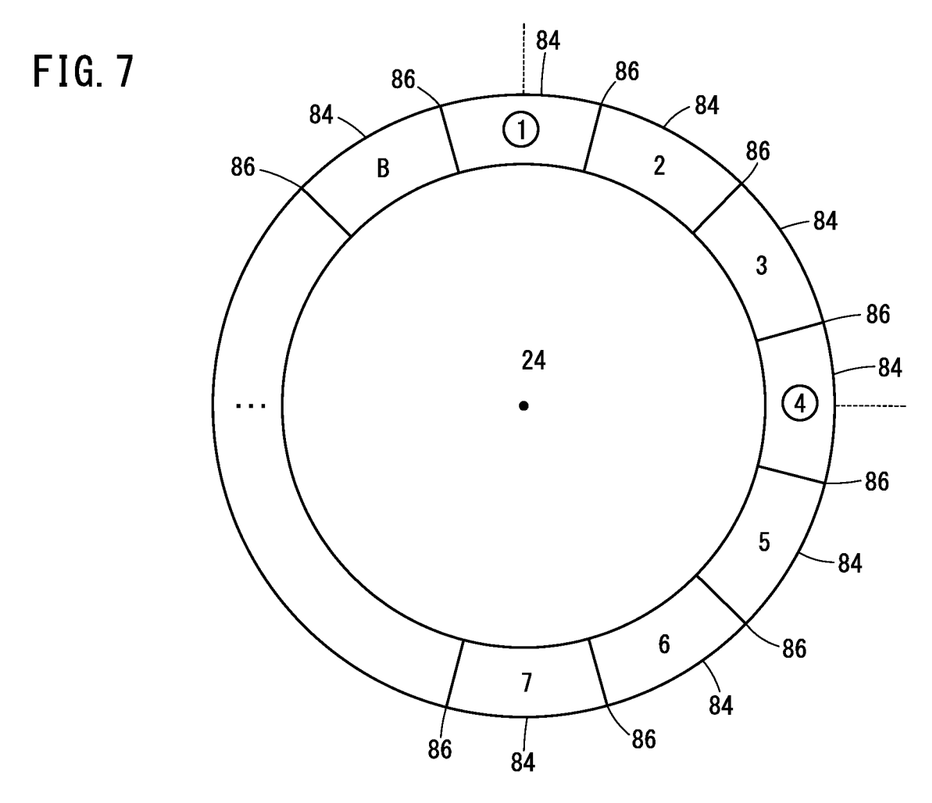
FIG. 7 is a schematic cross-sectional view of the liner divided into a plurality of segments.

The winding parameters determined by the parameter calculation unit 70 will be described. FIG. 7 is a schematic cross-sectional view of the liner 12 divided into a plurality of segments 84. The cross-section shown in FIG. 7 is perpendicular to the axis 24 of the high-pressure container 10. The cross section shown in FIG. 7 is, for example, a cross section at a predetermined position in the cylinder section 20.

The winding parameters include the number of segments Se, the number of cycles Cy, a rotation Ro, the number of skips Sk, a first start position SP1, a second start position SP2, a first winding position H1, and a second winding position H2.

[5-1. Number of Segments Se]

As shown in FIG. 7, the parameter calculation unit 70 divides the liner 12 into a plurality of segments 84 along the circumferential direction about the axis 24. The number of segments 84 at a predetermined position on the cylinder section 20 is referred to as the number of segments Se. Either one of the two band-shaped fibers 34 is wrapped on each segment 84. The two band-shaped fibers 34 are evenly wrapped around the outer wall surface of the liner 12. Therefore, the parameter calculation unit 70 sets the number of segments Se to an even number.

The parameter calculation unit 70 calculates the number of segments Se by using the following equations (1) and (2). f1(x) in the following equation (1) is a function that converts the numerical value x into a multiple of 2 that is larger than the numerical value x and is closest to the numerical value x.

$$Se = f1(\pi \times OD/BW') \quad (1)$$

$$BW' = BW/\cos(WA) \quad (2)$$

[5-2. Number of Cycles Cy]

As described above, the container manufacturing apparatus 30 repeats the one cycle of the winding operation while moving the winding position of the band-shaped fiber 34 in the circumferential direction of the liner 12. In order to arrange the band-shaped fibers 34 on the outer wall surface of the liner 12 without gaps, the cycle of the winding operation needs to be performed at least as many times as the number of segments 84. The number of repetitions of the cycle of the winding operation with one band-shaped fiber 34 is referred to as the number of cycles Cy.

In this embodiment, the container manufacturing apparatus 30 wraps the band-shaped fiber 34 once on each segment 84 of the liner 12. In this case, the number of cycles Cy is determined by the following equation (3). In the present embodiment, two band-shaped fibers 34 are used. Therefore, as shown in the following equation (3), the maximum value of the number of cycles Cy for each band-shaped fiber 34 is half of the number of segments Se.

$$Cy=Se/2 \quad (3)$$

[5-3. Rotation Ro]

As shown in FIG. 5, in one cycle of the winding operation, the winding trajectory 76 of the band-shaped fiber 34 moves (revolves) around the liner 12 centering on the axis 24. The number of revolutions of the winding trajectory 76 in one cycle of the winding operation is referred to as rotation Ro. Specifically, the rotation Ro is the number of revolutions of the winding trajectory 76 from the start point 78 to the end point 80. The rotation Ro consists of an integer part and a decimal part. The parameter calculation unit 70 calculates the rotation Ro by a predetermined algorithm using the design information of the high-pressure container 10.

[5-4. Number of Skips Sk]

In FIG. 7, sequential serial numbers 1, 2, 3, . . . , B are assigned to the respective segments 84. These serial numbers are referred to as segment numbers. In FIG. 7, the segment number "1" and the segment number "4" are circled. This means that one band-shaped fiber 34 is wrapped around a segment 84 with the segment number "1" and then wrapped around another segment 84 with the segment number "4". There are three boundaries 86 of the segments 84 between the segment 84 of the segment number "1" and the segment 84 of the segment number "4". The number of the boundaries 86 is referred to as the number of skips Sk.

The parameter calculation unit 70 calculates the number of skips Sk using the following equation (4). f2 (x) in the following equation (4) is a function that extracts a decimal part of a numerical value x. f3 (x) in the following equation (4) is a function that makes an integer of a numerical value x. For example, in f3 (x), the numerical value x is rounded off to the nearest integer. Alternatively, in f3 (x), the decimal part of the value x may be rounded down.

$$Sk=f3(f2(Ro) \times Se) \quad (4)$$

[5-5. First Start Position SP1, Second Start Position SP2]

The first start position SP1 is a left end position through which the band-shaped fiber 34 fed from the first yarn feeding unit 56 passes in the first cycle. The first start position SP1 is indicated by the position (segment number) of the segment 84 of the first dome section 18-1. The first start position SP1 is set in advance. For example, "1" is stored in the storage device 66 as the first start position SP1.

The second start position SP2 is a left end position through which the band-shaped fiber 34 fed from the second yarn feeding unit 60 passes in the first cycle. The second start position SP2 is indicated by the position (segment number) of the segment 84 of the first dome section 18-1.

The parameter calculation unit 70 calculates the second start position SP2 by using the following equations (5) and (6). f4 (x) in the following equation (5) is a function that extracts the integer part of a numerical value x. f5 (x, a) in the following expression (6) is a function for calculating a remainder obtained by dividing a numerical value x by "a".

$$k=f4(Ro) \quad (5)$$

$$SP2=f5(Se/2+1+(1/2) \times (Sk+k \times Se), Se) \quad (6)$$

[5-6. First Winding Position H1 and Second Winding Position H2]

The first winding position H1 is a left end position through which the band-shaped fiber 34 fed from the first yarn feeding unit 56 passes in each cycle. The first winding position H1 is indicated by the position (segment number) of the segment 84 of the first dome section 18-1. The parameter calculation unit 70 calculates the first winding position H1 using the following equation (7).

$$H1=f5(SP1+Sk \times (Cy-1), Se) \quad (7)$$

The second winding position H2 is a left end position through which the band-shaped fiber 34 fed from the second yarn feeding unit 60 passes in each cycle. The second winding position H2 is indicated by the position (segment number) of the segment 84 of the first dome section 18-1. The parameter calculation unit 70 calculates the second winding position H2 using the following equation (8).

$$H2=f5(SP2+Sk \times (Cy-1), Se) \quad (8)$$

6. Confirmation Table 74

Figure 3:
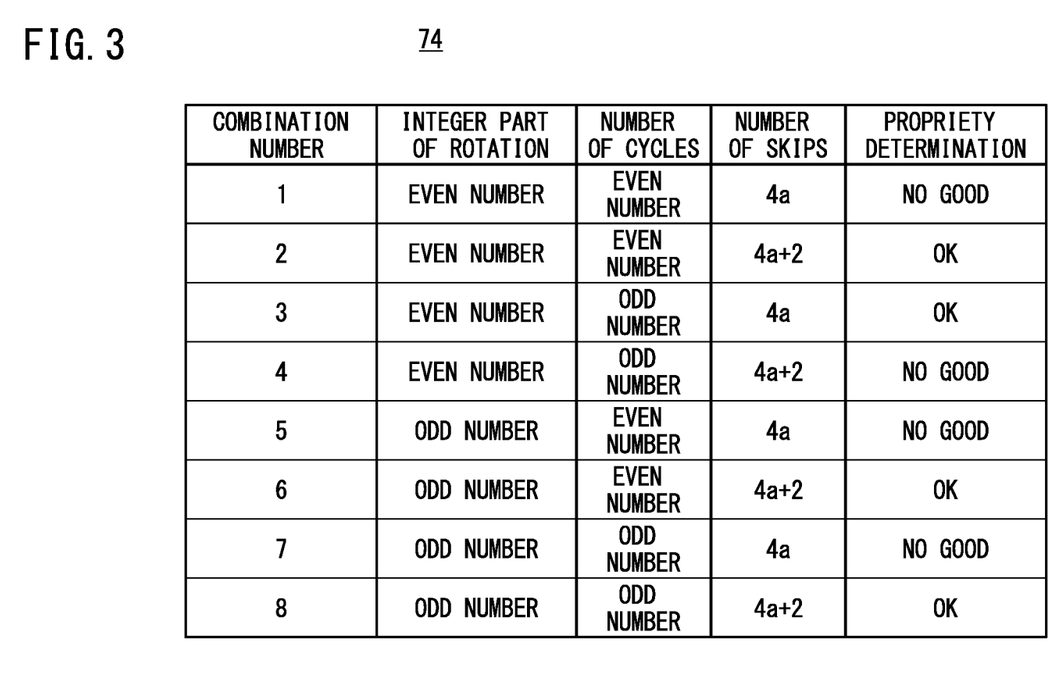
FIG. 3 is a diagram showing a confirmation table.

The parameter calculation unit 70 determines the propriety (acceptable/unacceptable) of the winding parameters by using the confirmation table 74 shown in FIG. 3. In other words, the parameter calculation unit 70 uses the confirmation table 74 to determine whether or not the band-shaped fiber 34 can be properly wound around the liner 12.

As described above, the confirmation table 74 is stored in the storage device 66. In the confirmation table 74, a combination of the integer part of the rotation Ro, the number of cycles Cy, and the number of skips Sk among the winding parameters is associated with the propriety determination.

In the confirmation table 74, the integer part of the rotation Ro is distinguished by whether it is an even number or an odd number. In the confirmation table 74, the number of cycles Cy is distinguished by whether it is an even number and an odd number. In the confirmation table 74, the number of skips Sk is distinguished by whether the number is expressed by "4a" or "4a+2". The expression "4a" represents a multiple of 4. The expression "4a+2" represents a multiple of 2 that is not a multiple of 4.

7. Operation of Container Manufacturing System 28

An operator operates the input/output device 68 to input design information for the high-pressure container 10. The parameter calculation unit 70 performs the processing shown in FIG. 8 on the basis of the input various information, and determines the winding parameters. The operation control unit 72 controls the motor of the rotation drive unit 46 based on the winding parameters. The liner 12 then rotates about the axis 24. Further, the operation control unit 72 controls the motor of the first drive unit 58 based on the winding parameters. Then, the first yarn feeding unit 56 moves right and left while feeding the band-shaped fiber 34. The operation control unit 72 controls the motor of the second yarn feeding unit 60 based on the winding parameters. Then, the second yarn feeding unit 60 moves right and left while feeding the band-shaped fiber 34. The first yarn feeding unit 56 and the second yarn feeding unit 60 move in opposite directions to each other.

Figure 8:
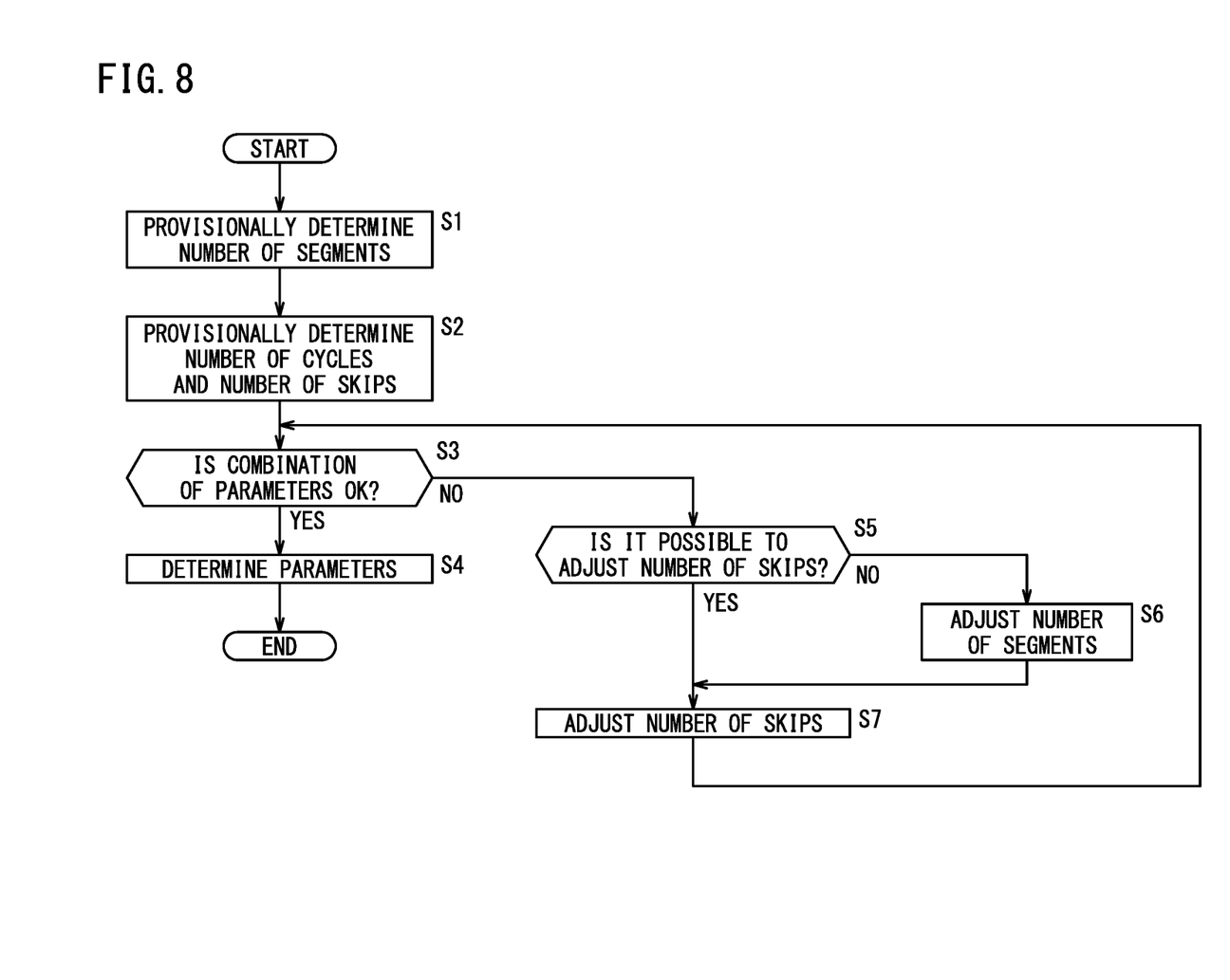
FIG. 8 is a flowchart of a winding parameter determination process.

FIG. 8 is a flowchart of a winding parameter determination process. The winding parameter determination process performed by the parameter calculation unit 70 will be described with reference to FIG. 8.

In step S1, the parameter calculation unit 70 provisionally determines the number of segments Se based on the variety of input information. Here, the parameter calculation unit 70 provisionally determines the number of segments Se by using the above-described equations (1) and (2). The provisionally determined number of segments Se is referred to as a candidate for the number of segments Se. Further, the parameter calculation unit 70 determines the rotation Ro based on the variety of input information. When step S1 is completed, the process transitions to step S2.

In step S2, the parameter calculation unit 70 provisionally determines the number of cycles Cy based on the candidate for the number of segments Se. Here, the parameter calculation unit 70 provisionally determines the number of cycles Cy using the above equation (3). The provisionally determined number of cycles Cy is referred to as a candidate for the number of cycles Cy. Further, the parameter calculation unit 70 provisionally determines the number of skips Sk based on the candidate for the number of segments Se and the rotation Ro. Here, the parameter calculation unit 70 provisionally determines the number of skips Sk using the above equation (4). The provisionally determined number of skips Sk is referred to as a candidate of the number of skips Sk. When step S2 is completed, the process transitions to step S3.

In step S3, the parameter calculation unit 70 determines whether or not a combination of the winding parameters is acceptable. The parameter calculation unit 70 collates the combination of the integer part of the rotation Ro, the candidate for the number of cycles Cy, and the candidate for the number of skips Sk with the confirmation table 74. When the combination of the winding parameters is associated with the OK determination (determination of being acceptable) in the confirmation table 74 (Step S3: YES), the process proceeds to step S4. On the other hand, in the confirmation table 74, when the combination of the winding parameters is associated with the No-Good determination (determination of being unacceptable) (step S3: NO), the process proceeds to step S5.

In step S4, the parameter calculation unit 70 determines the candidate for the number of segments Se, the candidate for the number of cycles Cy, and the candidate for the number of skips Sk as definitive winding parameters. When step S4 ends, the winding parameter determination processing is put to an end.

When transitioning from step S3 to step S5, the parameter calculation unit 70 determines whether or not adjustment of the number of skips Sk is possible. Hereinafter, an example of adjustment of the number of skips Sk will be described.

The above equation (4) is an equation for making an integer of the product of the decimal part of the rotation Ro and the number of segments Se. That is, in the above equation (4), the decimal part of the product is ignored. Therefore, according to the above equation (4), the position of the band-shaped fiber 34 is slightly shifted from the theoretical position. This deviation amount is defined as SA.

In the present embodiment, the parameter calculation unit 70 adjusts the number of skips Sk within a range of a predetermined adjustment amount. The threshold value for the adjustment amount of the number of skips Sk is defined by the following equations (9) and (10). The threshold value for the number of skips Sk is set such that the value of the deviation amount SA falls within a range of ±4%. However, the threshold value for the number of skips Sk may be set such that the value of the deviation amount SA falls within a range of ±5%. The threshold value for the number of skips Sk may be set such that the value of SA falls within a range of ±3%.

$$Ro'=(Sk/Se)\times f4(Ro) \qquad (9)$$

$$SA=1-(Ro/Ro')\times 100 \qquad (10)$$

When there is another number of skips Sk that allows the deviation amount SA to fall within the predetermined range, the parameter calculation unit 70 determines that the number of skips Sk can be adjusted. When the number of skips Sk is adjustable (step S5: YES), the process proceeds to step S7. On the other hand, when the number of skips Sk is not adjustable (step S5: NO), the process proceeds to step S6.

In step S6, the parameter calculation unit 70 adjusts the number of segments Se. The parameter calculation unit 70 adds 2 to the candidate for the number of segments Se and sets the result as a new candidate for the number of segments Se. That is, the number of cycles Cy of each yarn feeding unit is increased by 1. When step S6 is completed, the process transitions to step S7.

In step S7, the parameter calculation unit 70 adjusts the number of skips Sk. The parameter calculation unit 70 determines the adjustment value of the number of skips Sk such that the value of the deviation amount SA falls within a range of ±4%. The parameter calculation unit 70 adjusts the candidate for the number of skips Sk and sets the resultant as a new candidate for the number of skips Sk. When step S7 is completed, the process returns to step S3.

8. Specific Example

[8-1. Acceptable Example]

As an acceptable example, consider each of the following winding parameters:
Se=26
Ro=1.23
Cy=13
Sk=6

The integer part of the rotation Ro is an odd number. The number of cycles Cy is an odd number. The number of skips Sk is a multiple of 2 that is not a multiple of 4, that is "4a+2". The combination of the integer part of the rotation Ro, the number of cycles Cy, and the number of skips Sk corresponds to the combination number "8" in the confirmation table 74. The confirmation table 74 indicates that the propriety (acceptable/unacceptable) determination on the combination number "8" is "OK". Therefore, the operation control unit 72 can favorably perform the winding operation based on the above-described winding parameters. That is, the container manufacturing apparatus 30 can wind the two band-shaped fibers 34 around the liner 12 without a gap. The container manufacturing apparatus 30 can cover one segment 84 with one band-shaped fiber 34. Therefore, the container manufacturing apparatus 30 can minimize the amount of overlap between the two band-shaped fibers 34. Therefore, the amount of the band-shaped fibers 34 used can be reduced.

Figure 9:
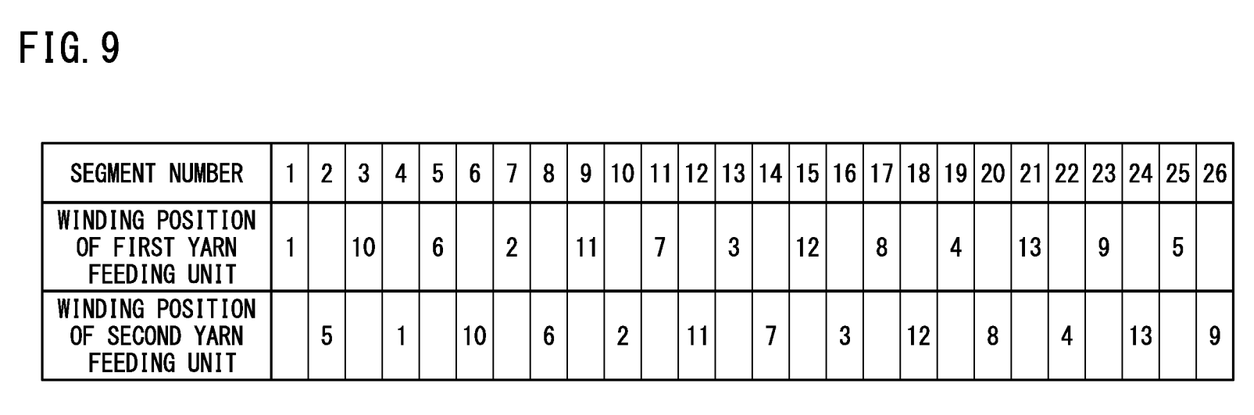
FIG. 9 is a view showing a position at which each yarn feeding unit winds a band-shaped fiber around a first dome section in a good example.

FIG. 9 is a diagram showing a position (segment number) at which each yarn feeding unit winds the band-shaped fiber 34 around the first dome section 18-1 in the acceptable example. In FIG. 9, the winding position of the first yarn feeding unit 56 corresponds to the first winding position H1 shown in the above equation (7). In FIG. 9, the winding position of the second yarn feeding unit 60 corresponds to the second winding position H2 shown in the above equation (8).

The first winding position H1 in each cycle from the first cycle to the thirteenth cycle is as follows:

H1=1, 7, 13, 19, 25, 5, 11, 17, 23, 3, 9, 15, and 21.

That is, in the first cycle, the first yarn feeding unit 56 winds the band-shaped fiber 34 around the segment 84 with the segment number "1" assigned. In the second cycle, the first yarn feeding unit 56 winds the band-shaped fiber 34 around the segment 84 with the segment number "7" assigned. In the 13th cycle, the first yarn feeding unit 56 winds the band-shaped fiber 34 around the segment 84 with the segment number "21" assigned.

The second winding position H2 in each cycle from the first cycle to the thirteenth cycle is as follows:

H2=4, 10, 16, 22, 2, 8, 14, 20, 26, 6, 12, 18, and 24.

That is, in the first cycle, the second yarn feeding unit 60 winds the band-shaped fiber 34 around the segment 84 having the segment number "4" assigned. The second yarn feeding unit 60 winds the band-shaped fiber 34 around the segment 84 with the segment number "10", in the second cycle. In the thirteenth cycle, the second yarn feeding unit 60 winds the band-shaped fiber 34 around the segment 84 having the segment number "24" assigned.

FIG. 9 shows the results described above. In FIG. 9, each of all the segment numbers is associated with either one of the first winding position H1 of the first yarn feeding unit 56 and the second winding position H2 of the first yarn feeding unit 56. That is, each segment 84 is covered with either one of the two band-shaped fibers 34. Thus, with the winding parameters of the acceptable example, it is possible to cover each segment 84 with a minimum amount of the band-shaped fiber 34.

[8-2. Unacceptable Example]

As an unacceptable example, consider each of the following winding parameters:

Se=26
Ro=1.23
Cy=13
Sk=8

The integer part of the rotation Ro is an odd number. The number of cycles Cy is an odd number. The number of Skips Sk is a multiple of 4, that is "4a". The combination of the integer part of the rotation Ro, the number of cycles Cy, and the number of skips Sk corresponds to the combination number "7" in the confirmation table 74. The confirmation table 74 indicates that the propriety (acceptable/unacceptable) determination on the combination number "7" is "No Good". Therefore, if the operation control unit 72 uses the above-described winding parameters, the winding operation cannot be favorably performed.

Figure 10:
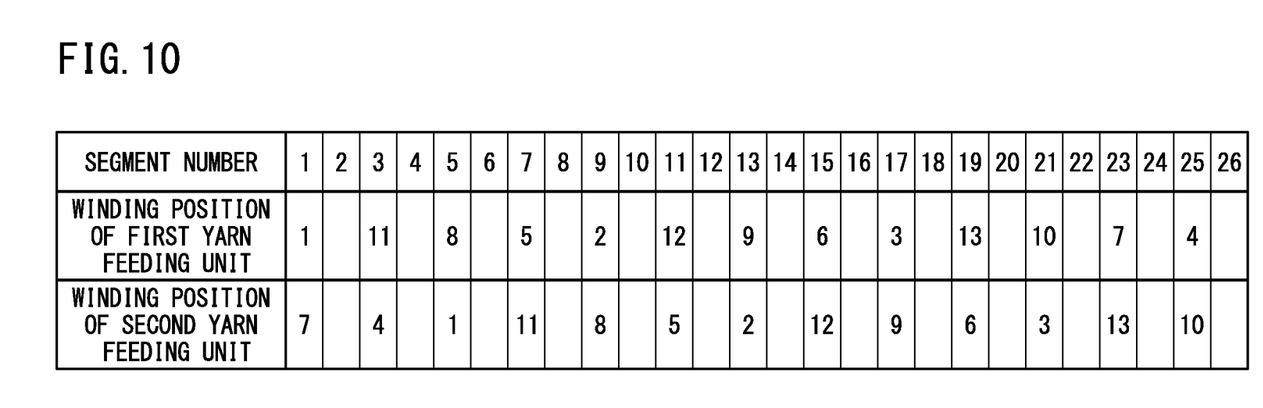
FIG. 10 is a diagram showing a position at which each yarn feeding unit winds the band-shaped fiber around the first dome section in a non-good example.

FIG. 10 is a diagram showing a position (segment number) at which each yarn feeding unit winds the band-shaped fiber 34 around the first dome section 18-1 in the unacceptable example. In FIG. 10, each of all the even segment numbers is not associated with either the first winding position H1 of the first yarn feeding unit 56 or the second winding position H2 of the first yarn feeding unit 56. That is, the segments 84 each having an even segment number are not covered with the band-shaped fiber 34.

As described above, the parameter calculation unit 70 determines whether or not a combination of a plurality of the winding parameters is acceptable, by referring to the confirmation table (reference table) 74. Therefore, the parameter calculation unit 70 can easily and appropriately determine the plurality of winding parameters.

9. Invention Obtained from Embodiment

The invention that can be grasped from the above embodiment will be described below.

A first aspect of the present invention is characterized by the parameter determination method for determining, using the computer (32), the plurality of winding parameters for operating the container manufacturing apparatus (30) that manufactures the high-pressure container (10) by winding the plurality of band-shaped reinforced fibers (34) around the liner (12), wherein the liner includes the first dome section (18-1) located at one end of the liner, the second dome section (18-2) located at another end of the liner, and the cylinder section (20) located between the first dome section and the second dome section, the container manufacturing apparatus repeatedly performs a cycle of the winding operation in which the winding position of the reinforced fiber is moved from the first dome section through the cylinder section to the second dome section and then moved back from the second dome section through the cylinder section to the first dome section, and the container manufacturing apparatus inclines the reinforced fibers with respect to the imaginary line (82) parallel to the axis (24) of the high-pressure container, when winding the reinforced fibers around the cylinder section, the parameter determination method including: with the computer, determining the winding parameters based on the width (BW) of the reinforced fibers, the angle (WA) formed by the reinforced fibers and the imaginary line, and the outer diameter (OD) of the cylinder section.

According to the above configuration, it is possible to efficiently wind the band-shaped reinforced fibers around the liner. That is, each portion of the outer wall surface of the liner is covered with either one of the reinforced fibers. The reinforced fibers have less overlapping portions. In this way, according to the above configuration, it is possible to cover each portion of the outer wall surface of the liner with a minimum amount of reinforced fibers. As a result, the amount of reinforced fibers used is reduced, and the weight of the high-pressure container is reduced.

In the first aspect, the liner may be divided into the plurality of segments (84) along the circumferential direction thereof about the axis, the container manufacturing apparatus may place the reinforced fibers on the segments of the liner, and the computer may determine the number of segments (Se) among the winding parameters.

In the first aspect, the computer may determine the number of cycles (Cy) among the winding parameters, based on the number of segments, and the number of cycles may be the number of repetitions of the cycle of the winding operation.

In the first aspect, the computer may determine the rotation (Ro) among the winding parameters, based on the number of segments, and the rotation may be the number of revolutions of the reinforced fiber around the axis per cycle of the winding operation.

In the first aspect, the computer may determine the number of skips (Sk) among the winding parameters, based on the number of segments and the rotation, and the number of skips may be the number of boundaries (86) of the segments located between the position of the segment on which the reinforced fiber is wound in an n-th cycle of the winding operation and the position of the segment on which the reinforced fiber is wound in an n+1-th cycle of the winding operation.

In the first aspect, the storage device (66) may store the confirmation table (reference table) (74) in which the combinations of the rotation, the number of cycles, and the number of skips are associated with the determination results on whether or not the reinforced fibers can be properly wound around the liner, and the computer may determine the candidate for each of the winding parameters based on the width of the reinforced fibers, the angle formed by the reinforced fibers and the imaginary line, and the outer diameter of the cylinder section, and may collate a combination of the determined candidates with the confirmation table to thereby determine whether or not the reinforced fibers can be properly wound around the liner.

In the first aspect, when it is determined that the reinforced fibers cannot be properly wound around the liner under condition of the combination of the candidates for the winding parameters, the computer may adjust the candidate for the number of skips, and thereafter collate the combination of the candidates containing the adjusted candidate with the confirmation table to thereby determine whether the reinforced fibers can be properly wound around the liner.

In the first aspect, when it is determined that the reinforced fibers cannot be properly wound around the liner under condition of the combination of the candidates containing the adjusted candidate for the number of skips, the computer may adjust the candidate for the number of segments and thereafter collate the combination of the candidates containing the adjusted candidate with the confirmation table to thereby determine whether the reinforced fibers can be properly wound around the liner.

A second aspect of the present invention is characterized by the parameter determination apparatus (32) that determines the plurality of winding parameters for operating the container manufacturing apparatus that manufactures the high-pressure container by winding the plurality of band-shaped reinforced fibers around the liner, the parameter determination apparatus including: the processor (64) configured to determine the winding parameters, wherein the liner includes the first dome section located at one end of the liner, the second dome section located at another end of the liner, and the cylinder section located between the first dome section and the second dome section, the container manufacturing apparatus repeatedly performs a cycle of the winding operation in which the winding position of the reinforced fiber is moved from the first dome section through the cylinder section to the second dome section and then moved back from the second dome section through the cylinder section to the first dome section, the container manufacturing apparatus inclines the reinforced fibers with respect to the imaginary line parallel to the axis of the high-pressure container, when winding the reinforced fibers around the cylinder section, and the processor determines the winding parameters based on the width of the reinforced fibers, the angle formed by the reinforced fibers and the imaginary line, and the outer diameter of the cylinder section.

The present invention is not limited to the above disclosure, and various modifications are possible without departing from the essence and gist of the present invention.

What is claimed is:

1. A method of operating a container manufacturing apparatus for manufacturing a high-pressure container by winding a plurality of band-shaped reinforced fibers around a liner that includes a first dome section located at one end of the liner, a second dome section located at another end of the liner, and a cylinder section located between the first dome section and the second dome section, the method comprising:
    positioning the liner within the container manufacturing apparatus so that the winding of the reinforced fibers is inclined at an angle with respect to an imaginary line parallel to an axis of the cylinder section;
    determining a width of the reinforce fibers;
    determining an outer diameter of the cylinder section;
    determining one or more winding parameters, the one or more winding parameters including:
        a number of segments determined based on the width of the reinforced fibers, the angle formed by the reinforced fibers and the imaginary line, and the outer diameter of the cylinder section,
        a number of cycles determined based on the number of segments, the number of cycles being a number of repetitions of the cycle of the winding operation, and
        rotation determined based on the number of segments, the rotation being a number of revolutions of the reinforced fiber around the axis per cycle of the winding operation;
    controlling the container manufacturing apparatus based on the determined winding parameters to repeatedly perform a cycle of a winding operation in which a winding position of each of the reinforced fibers is moved from the first dome section through the cylinder section to the second dome section and then moved back from the second dome section through the cylinder section to the first dome section.

2. The method of operating a container manufacturing apparatus according to claim 1, wherein
    the one or more winding parameters further include a number of skips determined, based on the number of segments and the rotation, and
    the number of skips is a number of boundaries of the segments located between a position of the segment on which the reinforced fiber is wound in an n-th cycle of the winding operation and a position of the segment on which the reinforced fiber is wound in an n+1-th cycle of the winding operation.

3. The method of operating a container manufacturing apparatus according to claim 2, further comprising:
    storing a confirmation table in which combinations of the rotation, the number of cycles, and the number of skips are associated with determination results on whether or not the reinforced fibers can be properly wound around the liner, and
    determining a candidate for each of the winding parameters based on the width of the reinforced fibers, the angle formed by the reinforced fibers and the imaginary line, and the outer diameter of the cylinder section, and collates a combination of the determined candidates with the confirmation table to thereby determine whether or not the reinforced fibers can be properly wound around the liner.

4. The method of operating a container manufacturing apparatus according to claim 3, further comprising:

when it is determined that the reinforced fibers cannot be properly wound around the liner under condition of the combination of the candidates for the winding parameters, adjusting the candidate for the number of skips, and thereafter collates the combination of the candidates containing the adjusted candidate with the confirmation table to thereby determine whether the reinforced fibers can be properly wound around the liner.

5. The method of operating a container manufacturing apparatus according to claim 4, further comprising:

when it is determined that the reinforced fibers cannot be properly wound around the liner under condition of the combination of the candidates containing the adjusted candidate for the number of skips, adjusting the candidate for the number of segments and thereafter collates the combination of the candidates containing the adjusted candidate with the confirmation table to thereby determine whether the reinforced fibers can be properly wound around the liner.

\* \* \* \* \*